United States Patent [19]

Knox et al.

[11] 4,279,266
[45] Jul. 21, 1981

[54] SLEEVE VALVE

[75] Inventors: Lloyd C. Knox; Robert B. Nickles, Jr., both of Duncan, Okla.

[73] Assignee: Halliburton Company, Duncan, Okla.

[21] Appl. No.: 142,926

[22] Filed: Apr. 23, 1980

[51] Int. Cl.³ ............................................. F16K 13/04
[52] U.S. Cl. ................................. 137/68 R; 137/587; 114/333; 220/265; 405/205
[58] Field of Search ..................... 137/68 R, 587, 797; 220/260, 265, 89 A; 114/52, 125, 333; 9/8 P, 8 R; 405/227, 205

[56] References Cited

U.S. PATENT DOCUMENTS

| 1,552,065 | 9/1925 | Laruer | 114/333 X |
| 2,409,071 | 10/1946 | Scott | 137/587 |
| 2,602,510 | 7/1952 | Baker | 137/68 R |
| 3,081,466 | 3/1963 | Bailey | 9/8 R |
| 3,199,199 | 8/1965 | Harrell | 137/625.38 X |
| 4,142,371 | 3/1979 | Mayfield | 405/227 X |

Primary Examiner—Harold W. Weakley
Attorney, Agent, or Firm—John H. Tregoning; James R. Duzan

[57] ABSTRACT

Sleeve valve for a tank having an opening therein.

5 Claims, 1 Drawing Figure

SLEEVE VALVE

BACKGROUND OF THE INVENTION

This invention relates to a tank having a valve therein.

On certain types of offshore or marine platforms, ballast or flotation tanks are used to provide flotation for the platform during the transportation and the erection thereof. When it is desired to erect the marine platform at the installation site, the ballast or flotation tanks are flooded through controlled operations.

In the past, ballast or flotation tanks have merely had conventional types of gate valves installed therein to use during flooding operations. However, unless a large number of gate valves are used, the flooding operations are lengthy.

SUMMARY OF THE INVENTION

In contrast to the prior art, the present invention provides a sleeve type valve which may be installed in ballast or flotation tanks to rapidly flood the same.

BRIEF DESCRIPTION OF THE DRAWINGS

The present invention will be more fully understood from the following specification taken in conjunction with the following drawing wherein.

DESCRIPTION OF THE INVENTION

Figure 1:
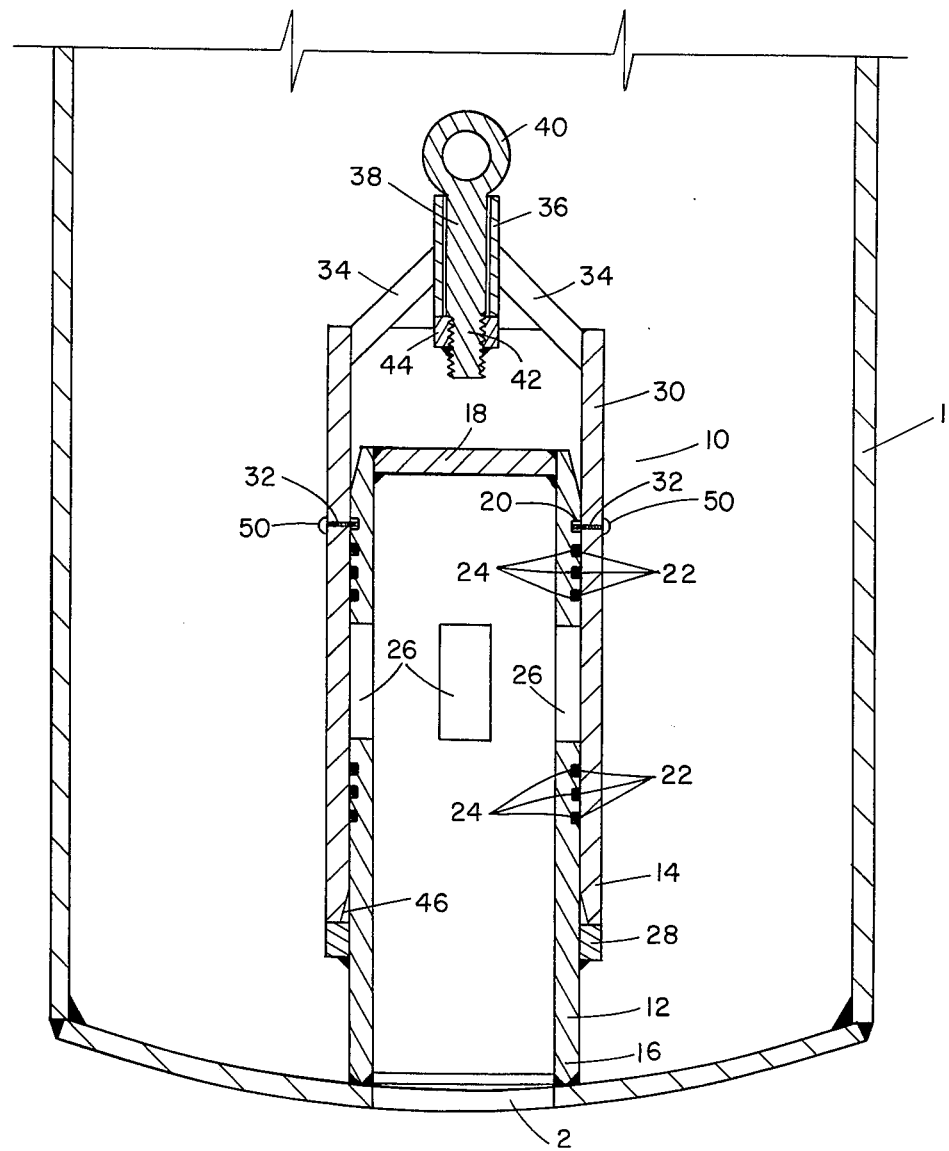
FIG. 1 is a cross-sectional view of the present invention installed in a ballast or flotation tank.

Referring to FIG. 1, the preferred embodiment of the sleeve valve 10 of the present invention is shown.

The sleeve valve 10 is shown installed in a ballast or flotation tank 1 having an opening 2 in one end thereof. The sleeve valve 10 comprises a central body member 12, sleeve member 14 and shear pin means 50.

The central body member 12 comprises an elongated cylindrical member 16 having one end thereof secured to the end of the ballast or flotation tank 1 surrounding the opening 2 therein, having the other end thereof sealed by circular plug 18, having an annular groove or recess 20 in the outer surface thereof, having a plurality of annular seal means 22 contained in annular seal cavities 24 in the outer surface thereof, having a plurality of apertures 26 therein, and having annular abutment means 28 on the exterior thereof.

The annular seal means 22 may be any suitable type of seal means, such as an elastomeric O-ring type seal means.

It should be understood that the annular seal means 22 are positioned on either side of apertures 26 in the central body member to prevent communication through apertures 26 when the sleeve member 14 is installed about the central body member 12.

The central body member 12 may be secured to the ballast or flotation tank 1 by any suitable means, such as welding.

If desired, the annular groove or recess 20 may be a plurality of apertures.

The annular abutment means 28 may be any suitable type of abutment means, such as an annular shoulder machined on exterior or outer surface of the central body member 12, an annular ring secured to the exterior or outer surface of the central body member 12 or one or more individual abutment pieces secured to the exterior or outer surface of the central body member 12.

The sleeve member 14 comprises an elongated cylindrical member 30 having a plurality of threaded apertures 32 therein, having a plurality of struts 34 extending from the interior of one end of the elongated cylindrical member 30 to a central sleeve 36 being secured thereto, and having an eyebolt 38 which has an eyelet 40 on one end thereof and threaded portion 42 on the other end thereof, the eyebolt 38 being retained within the central sleeve 38 by means of threaded fastening means 44 threadedly engaging the threaded portion 42 of the eyebolt 38. The sleeve member 14 is formed having annular chamfered surface 46 on one end thereof to facilitate the installation of the sleeve member 14 over the central body member 12.

To retain the sleeve member 14 in position on the central body member 16, a plurality of threaded shear pin means 50 threadedly engage apertures 32 in sleeve member 14 and have portions thereof extending into annular groove or recess 20 in the central body member 16.

The struts 34 may be secured to the elongated cylindrical member 30 and central sleeve 36 by any suitable means, such as welding.

To install the sleeve valve 10 in a ballast or flotation tank 1 having an opening 2 in one end thereof, the central body member 12 is secured to the tank 1 surrounding the opening 2 therein. The sleeve member 14 is subsequently installed over the central body member 12 having one end thereof abutting abutment means 28 on the exterior or outer surface of the elongated cylindrical member 16 of the central body member 12. The shear pin means 50 are then installed in sleeve member 14 having portions thereof extending into the annular groove or recess 20 of the central body member 12. After the sleeve member 14 has been secured to the central body member 12, a cable (not shown) is connected to the eyelet 40 of the eyebolt 38 and run through the wall of the ballast or flotation tank 1 to the exterior thereof. It is understood that the cable is sealed at the point of penetration of the wall of the ballast or flotation tank 1 to prevent communication of the interior of the tank with the exterior thereof.

To actuate the sleeve valve 10 to allow flooding of the tank 1, a force is applied to the cable (not shown) connected to the eyebolt 38 until the shear pin means 50 are sheared thereby releasing the sleeve member 12 from the central body member 14. With the continued application of force to the eyebolt 38 through the cable, the sleeve member 12 moves relative to the central body member 14 thereby uncovering the apertures 26 in the central body member 14. When the apertures 26 are uncovered by sleeve member 12, fluid is free to flow from the exterior of the tank 1 through opening 2 therein, through the apertures 26 in the central body member 12 into the interior of the tank 1 thereby flooding the same.

It should be noted that when the fluid flows through apertures 26 in the central body member 12, it flows or is directed into the sidewall of the tank 1 thereby dissipating the fluid energy thereon.

It should also be noted that if provisions are made in the tank 1 when the sleeve member 14 is removed from the central body member 12, it may be removed from the tank 1 without any interference from the fluid flowing through apertures 26 in the central body member 12.

From the foregoing it should be evident that the sleeve valve of the present invention is simple to construct, easy to use, can be made in any size to allow the rapid flooding of any size tank and has at least portions of which can be reused.

It should also be evident from the foregoing that although the present invention has been described in relation to a tank installed on a marine platform, the invention could be utilized in any tank having any number of openings therein.

Having thus described my invention, I claim:

1. In combination, a tank having an opening therein and a sleeve valve means installed within said tank, said sleeve valve means comprising:

central body means installed within said tank surrounding the opening therein, said central body means including:
  an elongated cylindrical body member having one end secured to said tank surrounding the opening therein, having the other end thereof sealed by circular plug means, having annular recess means in the outer surface thereof, having a plurality of apertures therein, having first annular seal means located on one side of the plurality of apertures, and having second annular seal means located on the other side of the plurality of apertures;
sleeve means installed over said central body means sealingly engaging the outer surface thereof, said sleeve means including:
  elongated cylindrical body means having a plurality of apertures therein, having strut means having one end thereof secured to the elongated cylindrical body means, having central sleeve means secured to the other end of the strut means, and having attachment means secured to the central sleeve means; and
shear type fastening means extending through the apertures in said sleeve means having a portion thereof engaging the annular recess means in said central body member thereby securing said sleeve means to said central body member.

2. The combination of claim 1 wherein said central body member further includes: abutment means on the outer surface of the elongated cylindrical member.

3. The combination of claim 2 wherein the first annular seal means and the second annular means of said central body member comprise elastomeric O-ring type seal means.

4. The combination of claim 3 wherein the attachment means secured to the central sleeve means of said sleeve means comprises eyebolt means.

5. In combination, a tank having an opening therein and a sleeve valve means installed within said tank, said sleeve valve means comprising:

central body means installed within said tank surrounding the opening therein, said central body means including:
  an elongated cylindrical body member having one end secured to said tank surrounding the opening therein, having the other end thereof sealed by circular plug means, having annular recess means in the outer surface thereof, having a plurality of apertures therein, having first annular elastomeric O-ring seal means located on one side of the plurality of apertures, having second annular elastomeric seal means located on the other side of the plurality of apertures, and having abutment means on the outer surface thereof;
sleeve means installed over said central body means sealingly engaging the outer surface thereof, said sleeve means including:
  elongated cylindrical body means having a plurality of apertures therein, having strut means having one end thereof secured to the elongated cylindrical body means, having central sleeve means secured to the other end of the strut means, and having eyebolt means secured to the central sleeve means; and
shear type fastening means extending through the apertures in said sleeve means having a portion thereof engaging the annular recess means in said central body member thereby securing said sleeve means to said central body member.

* * * * *